United States Patent
Patel et al.

(10) Patent No.: US 10,738,147 B2
(45) Date of Patent: Aug. 11, 2020

(54) N-HYDROXYL ETHYL PIPERIDINE (NHEP): A NOVEL CURING AGENT FOR EPOXY SYSTEMS

(71) Applicant: Evonik Operations GmbH, Essen (DE)

(72) Inventors: Pritesh G. Patel, Breinigsville, PA (US); Gauri Sankar Lal, Whitehall, PA (US); Douglas M. La Comare, Northampton, PA (US)

(73) Assignee: Evonik Operations GmbH, Essen (DE)

( * ) Notice: Subject to any disclaimer, the term of this patent is extended or adjusted under 35 U.S.C. 154(b) by 141 days.

(21) Appl. No.: 15/670,329

(22) Filed: Aug. 7, 2017

(65) Prior Publication Data

US 2018/0171067 A1    Jun. 21, 2018

Related U.S. Application Data

(60) Provisional application No. 62/437,440, filed on Dec. 21, 2016.

(51) Int. Cl.
| | |
|---|---|
| *B32B 27/38* | (2006.01) |
| *B32B 27/26* | (2006.01) |
| *B32B 27/04* | (2006.01) |
| *C08J 5/24* | (2006.01) |
| *C08L 63/00* | (2006.01) |
| *C08G 59/20* | (2006.01) |
| *C08G 59/50* | (2006.01) |
| *C08G 59/56* | (2006.01) |
| *C08G 59/64* | (2006.01) |
| *C08J 5/04* | (2006.01) |
| *C08K 7/14* | (2006.01) |

(52) U.S. Cl.
CPC ........... *C08G 59/506* (2013.01); *C08G 59/64* (2013.01); *C08J 5/043* (2013.01); *C08G 59/5026* (2013.01); *C08J 2363/00* (2013.01); *C08K 7/14* (2013.01)

(58) Field of Classification Search
None
See application file for complete search history.

(56) References Cited

U.S. PATENT DOCUMENTS

| | | | | |
|---|---|---|---|---|
| 3,839,281 | A * | 10/1974 | Dreher | C08G 59/64 525/107 |
| 4,268,656 | A * | 5/1981 | Ray-Chaudhuri | C08G 59/184 525/507 |
| 9,309,381 | B2 * | 4/2016 | Patel | C08G 59/50 |
| 9,862,798 | B2 * | 1/2018 | Zheng | C08G 59/60 |
| 10,155,840 | B2 * | 12/2018 | Ortelt | C08G 59/502 |
| 10,214,612 | B2 * | 2/2019 | Langkabel | C08G 59/5026 |
| 10,221,277 | B2 * | 3/2019 | Langkabel | C08G 59/5026 |
| 2014/0171551 | A1 * | 6/2014 | Patel | C08G 59/50 523/447 |
| 2014/0243456 | A1 | 8/2014 | Lal et al. | |
| 2015/0094400 | A1 * | 4/2015 | Zheng | C08G 59/60 523/222 |
| 2017/0166688 | A1 * | 6/2017 | Ortelt | C08G 59/502 |
| 2017/0355808 | A1 * | 12/2017 | Langkabel | C08G 59/506 |
| 2017/0355809 | A1 * | 12/2017 | Langkabel | C08G 59/5026 |

FOREIGN PATENT DOCUMENTS

WO    2014165423 A1    10/2014

OTHER PUBLICATIONS

PCT International Search Report dated Oct. 26, 2017 corresponding to PCT Application No. PCT/US2017/045741 filed Aug. 7, 2017 (5 pages).

* cited by examiner

*Primary Examiner* — Michael J Feely
(74) *Attorney, Agent, or Firm* — Andrew H. Chung; Linda S. Li; Jason S. Ngui

(57) ABSTRACT

The present invention relates to an amine-based curing agent comprising at least 1% by weight of at least one tertiary amine and, optionally, primary and/or secondary amines. The tertiary amine is preferably an N-substituted piperidine tertiary amine and, more preferably, N-hydroxyethyl piperidine (NHEP). The present invention also relates to an epoxy resin composition formed using this amine-based curing agent and a method of making the epoxy resin composition. These tertiary amines enhance desirable properties of epoxy resin compositions without the negative impact on mechanical properties in the cured product normally seen with tertiary amine-based curing agents.

20 Claims, No Drawings

N-HYDROXYL ETHYL PIPERIDINE (NHEP): A NOVEL CURING AGENT FOR EPOXY SYSTEMS

CROSS-REFERENCE TO RELATED APPLICATIONS

This application claims priority from U.S. Ser. No. 62/437,440 filed Dec. 21, 2016 having the same title, which is incorporated herein by reference in its entirety.

BACKGROUND OF THE INVENTION

Amines are commonly used as epoxy curing agents for heat cured structural composite and adhesive applications. The class of amine used as a curing agent is vital to achieve the final performance of the cured product. Each of the amine classes (primary, secondary, or tertiary amine) is cured at a specific temperature in order to achieve full cure. The cure temperature dictates the final service temperature, which is indicated by its $T_g$. In general, epoxy resins are predominately cured with primary and secondary amines. Tertiary amines are generally used as co-curing agents or catalysts in combination with primary and secondary amines.

Tertiary amines are known to induce homopolymerization of epoxy during cure which results in lower mechanical properties due to embrittlement. Tertiary amines such as benzyl dimethylamine (BDMA), 2,4,6-Tris-(dimethylaminomethyl)phenol (Ancamine® K-54), and mon-dimethylaminomethyl phenol (A1110®) are not suitable for use as a major curing agent to cure epoxy, because they induce homopolymerization which results in lower mechanical properties due to embrittlement and high exotherm during cure.

Epoxy resin systems are used in the manufacturing of various structural parts, including composites and adhesives. Examples of articles that are being evaluated for manufacturing from epoxy resin systems include composite pipes, pressure vessels, automotive parts and windmill blades. Fabricating such parts includes a number of requirements for effective manufacturing especially when complex manufacturing processes are used. These processes include but are not limited to resin infusion, resin transfer molding, filament winding and large casting. One need in the art is for reduced exothermic heat release during the epoxy resin system cure of the article (composite) in thicker sections of the article, since in such sections, the exothermic heat released during cure cannot be easily conducted away from the article. If excessive temperatures are reached during the cure process, thermal degradation of the cured resin in the "hot spots" can occur with resultant mechanical property loss in the fabricated parts.

Additionally, during cure, the composite parts may undergo thermal shrinkage. Thermal shrinkage of a cured epoxy resin causes stresses to build up in a composite during cool down from the maximum temperature reached at or after gelation. The stresses sometimes lead to interlaminar cracking in the article, with resultant loss of mechanical properties. The higher the temperature reached during cure after the gel point, the greater the amount of stress that will accumulate in the article during cooling.

Standard epoxy systems for fabricating structural parts are cured with stoichiometric quantities of aliphatic amines, usually primary amines. The systems generally have high cure exothermic temperatures, with the center of a 100-gram mass of resin/curing agent mixture (contained within a three inch diameter cylinder) often reaching a peak temperature of 250° C. or higher when cured in a 70° C. oven. Alternatively, epoxy systems cured with anhydride-based curing agents may often have lower cure exothermic heat release than those cured with primary amines. However, anhydride-cured systems typically require higher mold temperatures than systems cured with primary aliphatic amines to reach an acceptable degree of cure and level of cured properties.

Other requirements in the art include the absence of highly volatile components in the system for elevated temperature cure. The emission of volatile compounds during processing creates unwanted environmental, health and safety considerations.

Systems for composite processing require an initial mixed viscosity low enough (and rate of viscosity increase at the impregnation temperature low enough) to enable the reinforcing fiber preform to be completely wet with resin before the resin system becomes too viscous for satisfactory flow through the fibers and fabric of the substrate. The requirement for low initial viscosity and long pot life becomes more stringent as the size of the composite part increases.

In light of the above, there is a need in the art for improved curing agents for producing epoxy resin systems which have reduced exothermic heat release combined with desired cured mechanical properties when compared to the prior art resin compositions. Such curing agents must be free of undesirable features such as volatile emissions.

BRIEF SUMMARY OF THE INVENTION

It has been discovered that N-substituted piperidine tertiary amines, preferably N-hydroxyethyl piperidine (NHEP), can be used as the main curing agent for epoxy resin compositions without inducing the negative impact on mechanical properties of the cured product normally seen with tertiary amine-based curing agents. Test results show that using NHEP as the main curing agent maintains good mechanical performance in the cured epoxy composition. In addition, formulations containing NHEP give lower viscosity, longer pot life, low temperature $T_g$ development and lower exotherm during cure. NHEP can also be used in combination with primary and secondary amines as co-curing agents to further enhance the desirable properties. Preliminary results using NHEP in applications such as adhesives and composites (wind blades, high pressure vessels, etc.) are quite encouraging.

An aspect of the invention is an epoxy resin system containing the reaction product of an epoxy resin component and an amine-based curing agent component. The amine-based curing agent component has a first amine component and, optionally, a second amine component. The first amine component consists of one or more N-substituted piperidine tertiary amines. The second amine component consists of at least one primary amine and/or at least one secondary amine.

Another aspect of the invention is a method for producing a cured epoxy resin composition, comprising (a) combining an epoxy resin component with an amine-based curing agent component to form an initial epoxy resin composition, the amine-based curing agent component comprising a first amine component represented by the structure:

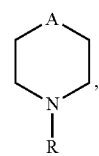

where A is $CH_2$, O, or NR' (where R' is H or an alkyl group of 1-10 carbon atoms), and R is an alkyl group of 1-10 carbon atoms and, optionally, one or more hetero atoms, the first amine component comprising at least 1% of the amine-based curing agent; (b) allowing a chemical reaction to occur between the at least one amine compound and the epoxy resin to form a cured epoxy resin composition.

Another aspect of the invention is a composition comprising the reaction product of an epoxy resin component; and a curing agent component, wherein the curing agent component comprises a first amine component represented by the structure:

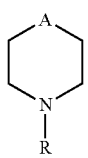

where A is $CH_2$, O, or NR' (where R' is H or an alkyl group of 1-10 carbon atoms), and R is an alkyl group of 1-10 carbon atoms and, optionally, one or more hetero atoms; wherein the first amine component comprises at least 1% (by weight) of the curing agent component.

Yet another aspect of the invention comprises a curing agent for curing epoxy resin, comprising a first amine component represented by the structure:

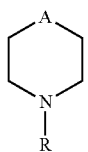

where A is $CH_2$, O, or NR' (where R' is H or an alkyl group of 1-10 carbon atoms), and R is an alkyl group of 1-10 carbon atoms and, optionally, one or more hetero atoms; a second amine compound comprising at least one selected from the group of a primary amine and a secondary amine, and wherein the first amine component comprises at least 1% by weight of the curing agent.

The second amine compound preferably comprises one or more amine compounds selected from the group consisting of a polyether diamine, a saturated aliphatic ring diamine, a linear aliphatic amine, and combinations thereof. The weight ratio of the epoxy resin to N-substituted piperidine tertiary amine and second amine is 1:0.4:0.6.

The polyether amine may have the formula: $H_2NCH(CH_3)CH_2—[OCH_2CH(CH_3)]_xNH_2$, and x is from 2 to 70.

The first amine compound may be one or more compounds selected from the group consisting of N-hydroxyethylpiperidine, N-hydroxyethylpiperazine, N-hydroxyethylmorpholine, bis1,4 (hydroxyethyl)piperazine, and 5-6 membered rings hydroxyalkyl cycloaliphatic amines, and the second amine may comprise a mixture of APCHA, isophoronediamine and the polyetheramine: $H_2NCH(CH_3)CH_2[OCH_2CH(CH_3)]_{2.5}NH_2$.

A modified amine compound such as a Mannich base, a polyamide compound, an amine-epoxy adduct, and combinations thereof may be used as a co-curing agent for use with the N-substituted piperidine tertiary amine compounds as described herein.

The epoxy resin component may comprise a polyglycidyl ether of a compound selected from the group consisting of an aliphatic glycol, a cycloaliphatic glycol, a triol, a polyol, a polyglycol, and combinations thereof. The epoxy resin system may further comprise a polyacrylate or polymethacrylate ester of a polyol.

DETAILED DESCRIPTION OF THE INVENTION

The epoxy resin system of the invention includes the reaction product of at least one epoxy resin component and a curing agent component containing at least one substituted piperidine. The invention comprises the use of these piperidine amines as curing agents for epoxy resins, especially in composite applications or ambient and heat cured coating applications. The piperidine can be used either alone or in combination with primary and/or secondary amines.

In prior art epoxy resin systems, the amine curing agent is usually added to the epoxy in such an amount that for each epoxy group in the system there is one reactive hydrogen atom in the curing agent. These are known as stoichiometric quantities. However, one aspect of the present invention is that when primary and secondary amines are used as co-curing agents with the N-substituted piperidine tertiary amine, the —NH bonds of the primary and/or secondary amines may be provided with stoichiometric ratios to epoxy groups ≤1.

In comparison with prior art systems based on mixtures of epoxy resins with stoichiometric quantities of primary and/or secondary amines, the epoxy resin systems described herein have unexpectedly and surprisingly provided the advantages of lowered cure exothermic temperatures and heat generation with improved control on cure shrinkage, and in some cases, a more rapid cure rate under lower temperature (enabling reduced cycle times).

As used herein, the term "amine-based curing agent" means a curing agent for which amines comprise at least 80% (by weight) of the overall weight of the curing agent.

As used herein, the term "amine" or "amine compound" means any derivative of ammonia in which alkyl or aryl groups replace one or more hydrogen atoms bonded to nitrogen. The term "primary amine" or "primary amine compound" means an amine where one of the three hydrogen atoms in ammonia is replaced by an alkyl or aromatic group (a C—N bond). The term "secondary amine" or "secondary amine compound" means an amine having two alkyl or aryl groups in place of two hydrogens. The term "tertiary amine" or "tertiary amine compound" means an amine in which all three hydrogens are replaced by alkyl or aryl groups. Any amine having more than one class of amine functional group may be categorized according to more than one class of amine (primary, secondary, or tertiary).

NHEP is compared to the exotherm curve of a typical tertiary amine curing agent (Ancamine K54 or 2,4,6,-Tris-(dimethylaminomethyl)penol). The peak exotherm for NHEP occurs much later in the curing process than for K54, and the rise in temperature is less intense. The lower exothermic heat release during the curing process helps to avoid the problems of embrittlement and thermal degradation experienced with prior art curing agents.

Epoxy Resin Composition

One aspect of the invention comprises an epoxy resin composition including a reaction product of an epoxy resin component and a curing agent component comprising at least 1% (by weight) N-substituted piperidine tertiary amines, and, optionally one or more primary amines and/or one or more secondary amines. Hereinafter, the portion of the curing agent consisting of one or more N-substituted piperidine tertiary amines is referred to as the first amine component and the optional portion of the curing agent containing primary and/or secondary amines is referred to as the second amine component.

In the epoxy resin composition, the weight ratio of the epoxy resin component to the first amine component in the curing agent preferably ranges from 1:0.05 to 1:0.4. The weight ratio of the epoxy resin component to the second amine component preferably ranges from 1:0.95 to 1:0.6.

The first amine component preferably comprises at least 1% (by weight) and, more preferably 10%-60% (by weight) of the overall weight of the curing agent. Most preferably, the first amine component comprises 25%-35% (by weight) of the overall weight of the curing agent.

The epoxy component preferably comprises 30% to 99% (by weight), more preferably, 40% to 92% (by weight), and most preferably, 50% to 85% (by weight), of the overall weight of the epoxy resin system.

Epoxy Resin Component

The epoxy resin component can consist of a single resin, or it can be a mixture of mutually compatible epoxy resins. The epoxy resin may include, but is not limited to, bi-functional epoxies, such as, bisphenol-A and bisphenol-F resins. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference in its entirety.

One class of epoxy resins suitable for use in the epoxy resin component comprises the glycidyl ethers of polyhydric phenols, including the glycidyl ethers of dihydric phenols. Illustrative examples include, but are not limited to, the glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the structure of formula (1) also are useful in the present disclosure:

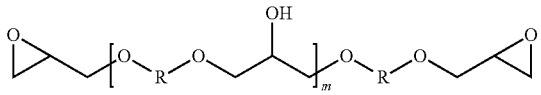

(1)

where m is 0 to 25, and R is a divalent hydrocarbon radical of a dihydric phenol, such as those dihydric phenols listed above.

Materials according to formula (1) can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, m-xylene dianiline, hydantoin, and isocyanate.

The epoxy resin component may be a cycloaliphatic (alicyclic) epoxide. Examples of suitable cycloaliphatic epoxides include diepoxides of cycloaliphaitc esters of dicarboxylic acids such as bis(3,4-epoxycyclohexylmethyl) oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxides. Other suitable diepoxides of cycloaliphatic esters of dicarboxylic acids are described, for example, in Patent Application Publication No. WO 2009/089145 A1, which is hereby incorporated by reference in its entirety.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate. Other suitable 3,4-epoxycyclohexylmentyl-3,4-epoxycyclohexane carboxylates are described, for example, in U.S. Pat. No. 2,890,194, which is hereby incorporated by reference in its entirety. In other embodiments, the epoxy component may include polyol polyglycidyl ether from polyethylene glycol, polypropylene glycol or polytetrahydrofuran or combinations thereof.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to 3000 or more. Because these products are solid at room temperature, they are often referred to as solid epoxy resins.

DGEBA or advanced DGEBA resins are often used for structural formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the present disclosure. In another aspect, the multifunctional epoxy resin has an EEW in a range from about 170 to about 250.

Depending upon the end-use application, it can be beneficial to reduce the viscosity of the compositions of the present disclosure by modifying the epoxy resin component. The epoxy resin component, which comprises at least one multifunctional epoxy resin, further comprises a monofunctional epoxide. Examples of monoepoxides include, but are not limited to, styrene oxide, cyclohexene oxide and the glycidyl ethers of phenol, cresols, tert-butylphenol, other alkyl phenols, butanol, 2-ethyihexanol, $C_4$ to $C_{14}$ alcohols, and the like, or combinations thereof. The multifunctional epoxy resin can also be present in a solution or emulsion, with the diluent being water, an organic solvent, or a mixture thereof.

Curing Agent Component

As noted above, the curing agent component is preferably an amine-based curing agent having a first amine component and, optionally, a second amine component. The first amine component consists of one or more N-substituted piperidine tertiary amines. The second amine component consists of at least one primary amine and/or at least one secondary amine.

First Amine Component

Each of the N-substituted piperidine tertiary amines which form the first amine component is preferably represented by the formula (2):

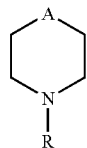

(2)

where A is $CH_2$, O, or NR' (where R' is H or an alkyl group of 1-10 carbon atoms), and R is an alkyl group of 1-10 carbon atoms and, optionally, one or more hetero atoms (such as O, N, S). R is preferably $CH_2CH_2OH$. In a preferred embodiment the first amine component comprises NHEP.

Second Amine Component

The second amine component can consist of a single amine or a mixture of amines. All of the amines in the second amine component are primary and/or secondary amines.

In some applications, the following are suitable as the second amine component: polyamines selected from one or more of an aliphatic polyamine such as diethylenetriamine (DETA), triethylenetetramine (TETA), teraethylenepentamine (TEPA), pentaethylenehexamine (PEHA), hexamethylenediamine (HMDA), N-(2-aminoethyl)-1,3-propanediamine ($N_3$-Amine), N, N'-1,2-ethanediylbis-1,3-propanediamine ($N_4$-amine), or dipropylenetriamine; an arylaliphatic polyamine such as m-xylylenediamine (mXDA), or p-xylylenediamine; a cycloaliphatic polyamine such as 1,3-bisaminocyclohexylamine (1,3-BAC), isophorone diamine (IPDA), or 4,4'-methylenebiscyclohexanamine (PACM), 4,4'-Methylenebis-(2-methyl-cyclohexanamine); an aromatic polyamine such as m-phenylenediamine, diaminodiphenylmethane (DDM), or diaminodiphenylsulfone (DDS); a heterocyclic polyamine such as N-aminoethylpiperazine (NAEP), or 3,9-bis(3-aminopropyl)2,4,8,10-tetraoxaspiro (5,5)undecane; a polyalkoxypolyamine where the alkoxy group can be an oxyethylene, oxypropylene, oxy-1,2-butylene, oxy-1,4-butylene or co-polymers thereof such as 4,7-dioxadecane-1,10-diamine, 1-propanamine,3,3'-(oxybis(2,1-ethanediyloxy))bis (diaminopropylated diethylene glycol ANCAMINE® 1922A), poly(oxy(methyl-1,2-ethanediyl)), alpha-(2-aminomethylethyl) omega-(2-aminomethylethoxy) (JEFFAMINE® D 230, D-400), triethyleneglycoldiamine and oligomers (JEFFAMINE® XTJ-504, JEFFAMINE® XTJ-512), poly(oxy(methyl-1,2-ethanediyl)), alpha,alpha'-(oxydi-2,1-ethanediyl)bis(omega-(aminomethylethoxy)) (JEFFAMINE® XTJ-511), bis(3-aminopropyl)polytetrahydrofuran 350, bis(3-aminopropyl)polytetrahydrofuran 750, poly(oxy (methyl-1,2-ethanediyl)), a-hydro-w-(2-aminomethylethoxy)ether with 2-ethyl-2-(hydroxymethyl)-1,3-propanediol (3:1) (JEFFAMINE® T-403), and diaminopropyl dipropylene glycol. JEFFAMINE® is a registered trademark of Huntsman Petrochemical LLC.

Particularly suitable polyamines include isophoronediamine (IPDA), 4,4'-methylenebiscyclohexanamine (PACM), 3,3'Dimethyl PACM (ANCAMINE® 2049), N-aminoethylpiperazine (NAEP), 4,7-dioxadecane-1,10-diamine,l-propanamine,3,3'-(oxybis(2,1-ethanediyloxy))bis-(ANCAMINE® 1922A), poly(oxy(methyl-1,2-ethanediyl)), alpha-(2-aminomethylethyl)omega-(2-aminomethylethoxy) (JEFFAMINE® D 230, D-400), poly(propylene glycol) bis (2-aminopropyl ether), aminopropylcyclohexanamine (APCHA), triethylene glycol diamine (JEFFAMINE® XTJ-504), and poly(oxy(methyl-1,2-ethanediyl))alpha,alpha'-(oxy(di-2,1-ethanediyl))bis(omega-(aminomethylethoxy)) (JEFFAMINE® XTJ-511) or mixture thereof. ANCAMINE® is a registered trademark of Evonik Degussa GmbH.

Additional amines suitable for forming the second amine component are polyamines comprising at least one or more multifunctional amine of structure (3).

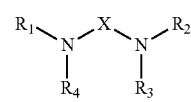

(3)

where $R_1$ is $CH_2CH_2CH_2NH_2$; $R_2$, $R_3$ and $R_4$ independently are H or $CH_2CH_2CH_2NH_2$; and X is $CH_2CH_2$ or $CH_2CH_2CH_2$. In one embodiment $R_2$ and $R_3$ are not H simultaneously.

Optional Additives

The epoxy system formulation for the composite may optionally include additives, such as, but not limited to, non-reactive plasticizer(s), filler(s), processing aid(s), stabilizer, air release agent, viscosity modifier(s), UV absorbent agent, a flame retardant, and/or an impact modifier.

The optional acrylate or methacrylate esters of the polyols are blended with the epoxy resin component in a weight ratio of from 0 to up to about 100 parts of ester for each 100 parts of epoxy resin component. In another embodiment, the acrylate or methacrylate esters of the polyols are blended with the epoxy resin component in a weight ratio of about 5 to about 100 parts of ester for each 100 parts of epoxy resin component.

Nano materials/fillers may be included. The term "nanomaterials," includes, but is not limited to, multi-wall carbon or boron nitride nanotubes, single-wall carbon, carbon or boron nitride nanoparticles, carbon or boron nitride nanofibers, carbon or boron nitride nanoropes, carbon or boron nitride nano ribbons, nanoclays; nanoclays comprising tubules; layered inorganic clay material; talc; carbon black; cellulose fibers; silica; and alumina.

Reinforcing fibers may also be included in the epoxy resin system. Suitable fibers include organic or inorganic fibers, natural fibers or synthetic fibers, and may be present in the form of wovens or non-crimp fabrics, nonwovens webs or mats, and also in the form of fiber stands (rovings), or staple fiber formed of continuous or discontinuous fiber such as fiber glass, carbon fiber, carbon nanotubes, nano composite fibers, polyaramide fibers such as those sold under the trade name KEVLAR®, Poly(p-phenylene benzobisoxazole) fiber such as those sold under the trade name ZYLON®, ultrahigh molecular weight polyethylene fibers such as those sold under the trade name SPECTRA®, high and low density polyethylene fibers, polypropylene fibers, nylon fibers, cellulose fibers, natural fibers, biodegradable fibers and combinations thereof.

These fibers (woven or non-woven) can be coated with the solvent or solvent free epoxy resin mixture by the standard impregnating methods, in particular for filament winding (FW), pultrusion, sheet molding compound, bulk molding compound autoclave molding, resin infusion, vacuum assisted resin transfer molding (VARTM), resin transfer molding (RTM), wet/hand lay-up, vacuum bagging, resin impregnation, prepreg, fiber impregnation, compression molding (CM), brushing, spraying, or dipping, casting, injection molding or combination thereof.

Forming a Cured Epoxy Composition

Mixing of the curing agent component and the epoxy component to form the epoxy resin composition can be in any order and by any appropriate means known in the art for two component epoxy compositions. The mixing may be accomplished according to any known method for mixing, including, but not limited to, mixing by magnetic stirrers, high shear mixing, hand mixing, mechanical mixing or other suitable mixing method. The mixing of the curing component is preferably carried out at a temperature in the range of 0 degrees to 150 degrees C., preferably 30 degrees to 60 degrees C.

The curable epoxy resin compositions and cured products described herein may be useful as adhesives, structural and electrical laminates, coating, casting, structural components for aerospace industries, and as circuit boards and the like for the electronics industry, among other applications. The curable epoxy resin compositions disclosed herein may also be used in electrical varnishes, encapsulants, semiconductors, general molding powders, filament wound pipes, low and high pressure pipes and fittings, low and high pressure vessels, storage tanks, wind turbine blades, automotive structural parts, aerospace structural parts, oil and gas buoyance modules, rigs, well plugs, cure-in-place-pipe (CIPP), structural bonding adhesives and laminates, a composite liner, liners for pumps, corrosion resistant coatings, and other suitable epoxy containing products.

The curable epoxy resin composition may be used to form composite materials on a reinforced fiber substrate. The reinforced fiber substrate may be one or more layers of fiberglass material. Contacting the reinforcing fiber substrate with the epoxy resin system may comprise an application process selected from the group consisting of including hand lamination, an infusion process, filament winding, pultrusion, resin transfer molding, fiber pre-impregnation processes, and combinations thereof.

In an embodiment, a method for producing the cured epoxy resin composition comprises (a) combining an epoxy resin component with an amine-based curing agent component to form an initial epoxy resin composition, the amine-based curing agent component comprising a first amine component represented by the structure:

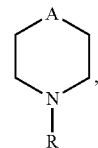

where A is $CH_2$, O, or NR' (where R' is H or an alkyl group of 1-10 carbon atoms), and R is an alkyl group of 1-10 carbon atoms and, optionally, one or more hetero atoms, the first amine component comprising at least 1% of the amine-based curing agent; (b) allowing a chemical reaction to occur between the at least one amine compound and the epoxy resin to form a cured epoxy resin composition. The method steps (a) and (b) may be performed at a first ambient temperature and a maximum internal temperature of the initial epoxy resin composition during steps (a) and (b) maintained that is no more than 50 degrees C. above the first ambient temperature.

When cured, the reaction product of the epoxy resin component and the curing agent component may exhibit a $T_g$ of 70 degrees C. or greater at a cure time of less than 2 hours as measured by Differential Scanning Calorimetry (DSC) and a first viscosity that is at least 50 cps. When curing, the reaction product of the epoxy resin component and the curing agent may exhibit a maximum exothermic temperature of below 50 degrees C. or lower for a 100 gram mass in an oven at 70 degrees C.

The product formed from the epoxy resin component and the curing agent may exhibit a maximum exothermic temperature of 50 degrees C. or lower during formation. The product may further include a reinforcing fiber substrate. The product may be in the form of various structural parts. The product may exhibit a flexural strength of greater than 70 MPa with a strain of 2% or greater and transverse tensile modulus of greater than 40 GPa, an in-plane inter-laminar shear strength of greater than 40 MPa.

EXAMPLES

Six formulations of epoxy resin components and curing agent components were prepared for comparison. For the epoxy resin components of the formulations, epoxy resins with EEW 180 and EEW 190 were combined with Epodil® 750 diluent.

TABLE 1

| | | Curing agent | | | | | |
|---|---|---|---|---|---|---|---|
| Resin system | Formulations | Jeffamine D230 (wt %) | NHEP (wt %) | APCHA (wt %) | IPDA (wt %) | Phr (parts by weight per 100 part of resin) | Mix Vis. (cps) @30 C. |
| EEW 180:Epodil 750 | 1 | 65 | — | — | 35 | 31 | 200 |
| EEW 190:Epodil 750 | 2 | 65 | — | — | 35 | 31 | 350 |
| EEW 180:Epodil 750 | 3 | 55 | 30 | 15 | — | 26 | 325 |
| EEW 190:Epodil 750 | 4 | 55 | 30 | 15 | | 26 | 260 |

TABLE 1-continued

| Resin system | Formulations | Curing agent | | | | Phr (parts by weight per 100 part of resin) | Mix Vis. (cps) @30 C. |
| | | Jeffamine D230 (wt %) | NHEP (wt %) | APCHA (wt %) | IPDA (wt %) | | |
| --- | --- | --- | --- | --- | --- | --- | --- |
| EEW 180:Epodil 750 | 5 | 65 | 15 | 20 | — | 23 | 300 |
| EEW 190:Epodil 750 | 6 | 65 | 15 | 20 | | 23 | 310 |

In Table 1 formulations 1-6 two different resins with EEW 180 & EEW190 were used. Curing agent components include a combination of primary, secondary and tertiary amines composition as described in Table 1. The first amine component is n-hydroxyethylpiperidine (NHEP). The second amine component includes primary and secondary amines. The primary amines include poly(propylene glycol) bis(2-aminopropyl ether)—(Jeffamine D230) and aminopropyl cyclohexanamine (APCHA). The secondary amines include aminopropyl cyclohexanamine (APCHA).

TABLE 2

| Formulation | Resin system | Phr | Pot life (mins) time to cps. 30 C. | | | Gel time (mins) 25 C. (150 gms) | $T_g$ C. (ISO) 70 C. for 7 hrs |
| | | | 1.2K | 5K | 150K | | |
| --- | --- | --- | --- | --- | --- | --- | --- |
| 1 | EEW 180:Epodil 750 | 31 | 185 | 275 | 425 | 364 | 85 |
| 2 | EEW 190:Epodil 750 | 31 | 115 | 195 | 318 | 250 | 85 |
| 3 | EEW 180:Epodil 750 | 26 | 220 | 335 | 575 | 450 | 85 |
| 4 | EEW 190:Epodil 750 | 26 | 155 | 260 | 457 | 362 | 85 |
| 5 | EEW 180:Epodil 750 | 23 | 210 | 347 | 668 | 550 | 85 |
| 6 | EEW 190:Epodil 750 | 23 | 172 | 311 | 584 | 442 | 85 |

Table 2 shows pot life, gel time and glass transition temperatures formulations 1-6 from Table 1.

The reactivity of all compositions shown in Example 2 were measured at 30 degrees C. using a Brookfield viscometer RV with spindle number 27. 12 grams of epoxy amine mixture is used to measure the reactivity.

A TECHNE gel timer was used to measure the gel time of all the formulations shown in Example 2. The one end of the metal rod was connected to the TECHNE gel timer and another end with a 1 inch diameter dish. The epoxy resin components and curing agent components were preheated separately at 25 degrees C. A total of 150 grams of mixture (epoxy resin component and curing agent component) were mixed for 3-5 minutes. The 1 inch diameter dish was immersed into the mixture and gel time was turn ON immediately to obtain accurate reading.

Differential Scanning calorimetric (DSC) was used to measure the $T_g$ (Glass transition temperature). A 20 mg sample of each formulation 1-6 was analyzed by DSC (TA Instruments QA20) using a program that starts at 25 degrees C. and heats at 10 degrees C./minute up to 300 degrees C., then cools to 205 degrees C. and scans a second time. The first scan provides cure data including onset temperature, peak exotherm and heat of reaction, while the second scan confirms the glass transition temperature.

Composite panels of formulations 1 and 6 (see Table 1) were fabricated using Vacuum Assisted Resin Transfer Molding (VARTM) using following steps:
(1) The metal mold (10) was prepared by coating the entire mold inner surface by SEALER GP and followed by ENVIROSHIELD NON-HAZARDOUS RELEASE AGENT from Zyvax to avoid sticking of epoxy to the aluminum surface.
(2) The mold was heated to 45 degrees C. for 30 minutes to ensure the release agent was completely dried before stacking the glass fabric. Mold plates are machined to produce 6 inch×6 inch×⅛ inch (15 cm×15 cm×0.32 cm) (length×width×depth) composite panels. Twelve layers of unidirectional fiber glass (275 gram/square meter) were carefully stacked into the mold cavity (20) without fabric overlap and wrinkle in each layer. The top half (30) of the mold (10) was then closed and continued to heat at 45 degrees C. (shown open for illustrative purposes). The necessary tubing was connected and a rotary vacuum pump (40) is used to evacuate the system. A vacuum pressure of about 15 psi or 29 inch Hg vacuum (98 KPa) was achieved and maintained.
(3) The stoichiometry amount of Epon826 and amine curatives as described in above Example 1 were hand mixed at 40 degrees C. for 3-5 mins. Entrapped air was removed by placing the mixture in a centrifuge for 5 minutes or until the mixture was clear. The mixture was placed near the inlet tube of the mold. The PVC ball valve was gently open to let mixture to flow through tube to infuse through fiberglass plies layered within a closed aluminum mold. Fibers are infused with resin until most of the pre-weighed mixture is consumed from the beaker. Excess resin is collected in a catch pot. Integrated rod heaters allow the mold to be pre-warmed during infusion (40-60 degrees C.) that allow uniform flow of resin in the mold for better fiber wetting. The mold was heated to higher temperature (80 degrees C. for 2 hours+150 degrees C. for 3 hours) for post-curing. After finishing the cure schedule the mold was cooled down to room temperature to remove the composite panel.

Mechanical properties of the composite panels prepared as described above are shown in Table 3.

TABLE 3

| Resin system | Formulations | Flexural Strength (psi) ASTM D790 | Flexural Modulus (psi) |
| --- | --- | --- | --- |
| EEW 190:Epodil 750 | 2 | 148,539 (1024 MPa) | 6,415,931 (44,235 MPa) |
| EEW 190:Epodil 750 | 6 | 158,310 (1091 MPa) | 6,153,309 (42,426 MPa) |

The test results presented above show that formulations that include NHEP as a main curing agent exhibit extended pot life and gel time, while maintaining desirable mechanical properties in the cured product.

What is claimed is:

1. A method for producing a cured epoxy resin composition, comprising:
   (a) combining an epoxy resin component with an amine-based curing agent component to form an initial epoxy resin composition, the amine-based curing agent component comprising N-hydroxyethyl piperidine as a first amine component and a second amine component selected from the group consisting of aminopropyl cyclohexanamine, diethylenetriamine, triethylenetetramine, tetraethylenepentamine, pentaethylenehexamine, hexamethylenediamine, N-(2-aminoethyl)-1,3-propanediamine, N, N'-1,2-ethanediylbis-1,3-propanediamine, dipropylenetriamine, 1,3-bisaminocyclohexylamine, isophorone diamine, 4,4'-methylenebiscyclohexanamine, 4,4'-Methylenebis-(2-methyl-cyclohexanamine), and alpha-(2-aminomethylethyl) omega-(2-aminomethylethoxy); and wherein the first amine component is present in an amount of 10%-60% by weight of the amine-based curing agent component; and
   (b) allowing a chemical reaction to occur between the amine-based curing agent component and the epoxy resin component to form a cured epoxy resin composition.

2. The method of claim 1, further comprising:
   (c) performing steps (a) and (b) at a first ambient temperature; and
   (d) maintaining a maximum internal temperature of the initial epoxy resin composition during steps (a) and (b) that is no more than 50 degrees C. above the first ambient temperature.

3. The method of claim 2, wherein step (a) further comprises combining an epoxy resin component with an amine-based curing agent component to form an initial epoxy resin composition having a first viscosity that is at least 50 cps, and step (b) further comprises forming a cured epoxy resin composition having a $T_g$ of at least 70 degrees C.

4. The method of claim 1, further comprising:
   (c) applying the initial epoxy resin composition to a reinforcing fiber substrate after performing step (a) and before performing step (b).

5. A composition comprising the reaction product of:
   an epoxy resin component; and
   a curing agent component, wherein the curing agent component comprises:
      N-hydroxyethyl piperidine as a first amine component and a second amine component selected from the group consisting of aminopropyl cyclohexanamine, diethylenetriamine, triethylenetetramine, tetraethylenepentamine, pentaethylenehexamine, hexamethylenediamine, N-(2-aminoethyl)-1,3-propanediamine, N, N'-1,2-ethanediylbis-1,3-propanediamine, dipropylenetriamine, 1,3-bisaminocyclohexylamine, isophorone diamine, 4,4'-methylenebiscyclohexanamine, 4,4'-Methylenebis-(2-methyl-cyclohexanamine), and alpha-(2-aminomethylethyl) omega-(2-aminomethylethoxy); and
      wherein the first amine component is present in an amount of 10%-60% by weight of the curing agent component.

6. The composition of claim 5, further comprising a stoichiometric ratio of the second amine component to the epoxy resin component, wherein the stoichiometric ratio is less than one.

7. The composition of claim 5, wherein the epoxy resin component is present in an amount of about 30% to about 99% by weight of the composition.

8. The composition of claim 5, wherein the epoxy resin component comprises a glycidyl ether of polyhydric phenol.

9. The composition of claim 5, wherein the epoxy resin component comprises at least one glycidyl ether selected from the group consisting of glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane, bis-(4-hydroxyphenyl)-methane, novolac resins, and combinations thereof.

10. The composition of claim 5, wherein the epoxy resin component comprises at least one dihydric phenol of the following structure:

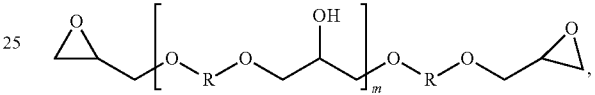

wherein m is 0 to 25 and R is a divalent hydrocarbon radical.

11. The composition of claim 5, wherein the epoxy resin component comprises at least one member selected from the group consisting of: bis(3,4-epoxycyclohexylmethyl)oxalate, bis(3,4-epoxycyclohexylmethyl)adipate, bis(3,4-epoxy-6-methylcyclohexylmethyl)adipate, vinylcyclohexene diepoxides; limonene diepoxide; bis(3,4-epoxycyclohexylmethyl)pimelate; dicyclopentadiene diepoxide, 3,3-epoxycyclohexylmethyl-3,4-epoxycyclohexane carboxylate, 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate, and combinations thereof.

12. The composition of claim 5, further comprising a reinforcing fiber.

13. The composition of claim 12, wherein the reinforcing fiber is selected from the group consisting of woven fabrics, non-crimp fabrics, nonwoven webs, nonwoven mats, fiber stands, staple fiber formed of continuous fiber, staple fiber formed of discontinuous fiber, and combination thereof.

14. The composition of claim 12, wherein the reinforcing fiber is selected from the group consisting of fiberglass, carbon fiber, carbon nanotubes, nano composite fibers, polyaramide fibers, poly(p-phenylene benzobisoxazole) fiber, Aramid fiber, ultrahigh molecular weight polyethylene fiber, high density polyethylene fibers, low density polyethylene fibers, polypropylene fibers, nylon fibers, cellulose fibers, natural fibers, biodegradable fibers and combinations thereof.

15. The composition of claim 12, wherein the composition is made from a process selected from the group consisting of resin infusion, vacuum assisted resin transfer molding (VARTM), resin transfer molding (RTM), filament winding (FW), compression molding (CM), wet/hand lay-up, vacuum bagging, injection molding, prepreg, fiber impregnation, casting and combinations thereof.

16. An article of manufacture comprising the composition as set forth in claim 12, wherein the article is selected from the group consisting of low pressure pipes, high pressure pipes, low pressure fittings, high pressure fittings, low pressure vessels, high pressure vessels, storage tanks, wind turbine blade, automotive structural parts, aerospace structural parts, oil buoyance modules, gas buoyance modules, rigs, well plugs, cure-in-place-pipe (CIPP), structural bonding adhesives, structural bonding laminates, encapsulation, a semiconductor, corrosion resistance coatings, and a composite liner.

17. A method for producing a cured epoxy resin composition, comprising:
   (a) combining an epoxy resin component with an amine-based curing agent component to form an initial epoxy resin composition, the amine-based curing agent component consisting of N-hydroxyethyl piperidine; and
   (b) allowing a chemical reaction to occur between the amine-based curing agent component and the epoxy resin component to form a cured epoxy resin composition.

18. The method of claim 17, further comprising:
   (c) performing steps (a) and (b) at a first ambient temperature; and
   (d) maintaining a maximum internal temperature of the initial epoxy resin composition during steps (a) and (b) that is no more than 50 degrees C. above the first ambient temperature.

19. The method of claim 17, wherein step (a) further comprises combining an epoxy resin component with an amine-based curing agent component to form an initial epoxy resin composition having a first viscosity that is at least 50 cps, and step (b) further comprises forming a cured epoxy resin composition having a $T_g$ of at least 70 degrees C.

20. The method of claim 17, further comprising:
   (c) applying the initial epoxy resin composition to a reinforcing fiber substrate after performing step (a) and before performing step (b).

\* \* \* \* \*